United States Patent [19]

Bohm et al.

[11] Patent Number: 5,001,171

[45] Date of Patent: Mar. 19, 1991

[54] PROCESS, MODIFIED RUBBERS AND RUBBER COMPOSITIONS

[75] Inventors: Georg G. Bohm, Akron; Daniel F. Graves, Clinton, both of Ohio

[73] Assignee: Bridgestone/Firestone, Inc., Akron, Ohio

[21] Appl. No.: 260,631

[22] Filed: Oct. 21, 1988

Related U.S. Application Data

[62] Division of Ser. No. 129,562, Dec. 7, 1987.

[51] Int. Cl.$^5$ .......................... C08K 3/04; C08K 5/35; C08K 5/34; C08J 3/20
[52] U.S. Cl. .................................. 523/206; 523/215; 523/351; 524/87; 524/89; 524/91; 524/92; 524/93; 524/94; 524/100; 524/519; 524/521; 524/523; 524/526
[58] Field of Search ...................... 523/215, 351, 206; 524/89, 87, 91, 519, 521, 523, 526, 92, 93, 94, 100

[56] References Cited

U.S. PATENT DOCUMENTS

| | | | |
|---|---|---|---|
| 4,005,053 | 1/1977 | Briggs et al. | 523/351 |
| 4,128,523 | 12/1978 | Britton et al. | 525/232 |
| 4,321,128 | 2/1982 | Veda et al. | 523/351 |
| 4,375,497 | 3/1983 | Sandstrom | 523/206 |
| 4,395,501 | 7/1983 | Briggs | 523/351 |
| 4,417,005 | 11/1983 | Tokieda et al. | 523/351 |
| 4,557,306 | 12/1985 | Graves | 525/337 |
| 4,705,817 | 11/1987 | Scriver | 523/351 |
| 4,761,446 | 8/1988 | Graves et al. | 525/347 |
| 4,762,870 | 8/1988 | Graves et al. | 525/347 |
| 4,788,229 | 11/1988 | Bohm et al. | 523/206 |

*Primary Examiner*—Herbert J. Lilling
*Attorney, Agent, or Firm*—Daniel N. Hall

[57] ABSTRACT

It now has been found that uncured modified rubber compositions comprising mixtures of elastomers and a reinforcing filler can be prepared having improved properties. More particularly, such uncured modified rubber compositions can be prepared by a process which comprises the steps of (A) preparing a first mixture comprising an elastomer, at least one reinforcing filler and at least one chemical agent capable of promoting the formation of filler-elastomer linkages;

(B) preparing a second mixture comprising
  (i) an elastomer, at least one reinforcing filler and at least one chemical agent capable of promoting the formation of filler-elastomer linkages, wherein at least one of the elastomer, filler or chemical agent in the second mixture is different from the elastomer, filler or chemical agent in the first mixture; or
  (ii) an elastomer and at least one reinforcing filler; or
  (iii) at least one reinforcing filler and at least one chemical agent capable of promoting the formation of filler-elastomer linkages; or
  (iv) an elastomer and at least one chemical agent capable of promoting the formation of filler-elastomer linkages; and (C) blending the first and second mixtures to form a third mixture. Examples of such useful chemical agents include aromatic furazan oxides, heterocyclic di-N-oxides, 1-hydroxy-benzimidazole-3-oxide compounds, 1,3-dihydroxy-benzimidazolinone compounds, and aromatic nitroso compounds.

The invention also includes filled vulcanizates prepared by vulcanizing the uncured modified rubber compositions prepared in accordance with the above method. Rubber articles and portions thereof made from such vulcanizates such as tires, hoses, belts, treads, sidewalls and the like are also within the scope of the present invention as well as methods of reducing the rolling resistance of tires.

31 Claims, No Drawings

PROCESS, MODIFIED RUBBERS AND RUBBER COMPOSITIONS

This application is a divisional of application Ser. No. 129,562, filed Dec. 7, 1987.

TECHNICAL FIELD OF THE INVENTION

This invention relates to a process of preparing uncured modified rubbers, to said modified rubbers, to rubber compositions containing said rubbers, and to methods for reducing the rolling resistance of pneumatic tires. More particularly, the present invention relates to a method of preparing uncured modified rubber compositions which comprise mixtures of elastomers, reinforcing filler, and chemical agents capable of promoting the formation of filler-elastomer linkages. Filled vulcanizates made by vulcanizing such mixtures of the uncured rubber compositions of the invention exhibit a reduction in hysteresis, and tires which are made to include said cured vulcanizates in at least the tread portion exhibit reduced rolling resistance.

BACKGROUND OF THE INVENTION

It is known that rubber compositions generally are combined or "compounded" with various other materials before being cured and/or put into use. Some of these added materials improve the properties of the end product in service while others improve processing properties of the uncured compositions. In some instances, both effects may be achieved. It is also known that the various chemicals, pigments and other materials so used, both organic and inorganic, can interact in various ways to produce desirable or deleterious effects. For further discussions of rubber processing and materials used therein, see, for example, *Encyclopedia of Polymer Science and Technology*, published by John Wiley and Sons, New York (1970), particularly Vol. 12, page 280 and *The Vanderbilt Rubber Handbook*, R. T. Vanderbilt Company, Norwalk, Conn., 06855 (1968), particularly Sections 6, 7, 8, 9 and 11.

Vulcanizing agents, plasticizers, extenders, fillers, pigments, etc. generally are incorporated into vulcanizable rubber compositions so that the rubber can be cured or vulcanized in a mold to form useful articles. It often is necessary to include processing aids in rubber compounds prior to molding and curing. These processing aids are primarily intended to improve the mixing of the ingredients of the rubber compound, the flowability of the rubber during processing, and the mold or mill release properties of the rubber, tack and green strength, without seriously adversely affecting the properties of the cured rubber.

Carbon blacks are used in rubber formulations and vary widely as to their characteristics and combinations of characteristics. In rubber formulations, carbon black is used as a reinforcing filler. Many carbon blacks of the channel and furnace types with varying characteristics have been utilized because they impart varying desirable characteristics to the rubber.

U.S. Pat. No. 4,395,501 describes a process for producing vulcanizates wherein a polymer (or polymers) is mixed with carbon black in two separate steps. In one step, a major proportion of the carbon black is mixed with polymer, and in the second step a zero to minor proportion of the carbon black is mixed with the polymer. Other compounding ingredients excluding curing agents can be included in the two mixtures. The two mixtures are then blended together and vulcanized.

Various compounds have been incorporated into filled elastomer formulations which are capable of promoting the formation of filler-elastomer linkages and improving the hysteresis properties (i.e., lowering) of the vulcanizates prepared from such formulations.

Benzofurazan oxides, and their analogs and isomers are known compounds, and many descriptions of them and procedures for their preparation have appeared. See, for example, Kaufman et al, "Chemical Reviews", Vol. 59, page 429 and following (1959) and Mallory et al, *Organic Synthesis* collective Vol. IV, pp. 74 and 75, John Wiley and Sons, New York (1963). The following U.S. patents also describe procedures for preparing furazan oxides of various types: U.S. Pat. Nos. 4,185,018 to Fah; 3,528,098 to Shaw; and 2,424,199 to Ter Horst. In considering previous descriptions of furazan oxides and related compounds, it should be noted that nomenclature used for these compounds has not been consistent, in part due to uncertainty as to example, they have been described as furazan oxides, as ortho dinitroso benzenes or di(nitrile oxides), isobenzofuroxans, benzofuroxans, benzofurazan-N-oxides and benzofurazan oxides. It is believed that the latter term is the modern and preferred nomenclature, and it shall be used in this specification and the appended claims.

Studies of furazan oxides and related compounds in rubber have been reported. U.S. Pat. No. 3,931,121 to Davis et al, describes the curing of elastomeric polymers with poly(chloronitroso) compounds. U.S. Pat. No. 3,931,106 to Crosby et al, describes the use of dinitrile oxides, (generated in situ from furoxans), in rubber cross-linking.

British Patent 1,586,861 describes the use of organic compounds which are sources of adjacent nitroso groups on a six-membered aromatic ring for modifying polymeric materials containing carbon-carbon unsaturation. Examples of such polymeric materials include polybutadiene, styrene-butadiene copolymers, butyl rubber, natural rubber and EPDM rubbers. The polymeric materials can contain fillers such as carbon black and fumed silica. Benzofurazan oxide is an example of a source material for the adjacent nitroso groups. The patentees suggest that the furazan oxide can be mixed with the polymeric material using conventional rubber mixing techniques or other conventional plastics or paints technology followed by heating of the mixture to effect modification of the polymer, e.g., cross-linking of the polymer. The common rubber additives may be mixed into the polymer before reacting it with the furazan oxide.

U.S. Pat. No. 2,974,120 to Miller describes the use of non-aromatic furoxans as antioxidants and antidegradants in rubber. U.S. Pat. No. 2,905,582 to Coleman et al, describes the use of nitroso compounds, including dinitroso compounds wherein the nitroso groups are on nonadjacent carbons in a method for bonding polyurethane resin to rubber bodies. Morita has described the use of N,4-dinitroso-N-methyl aniline as an active chemical promoter for carbon black reinforcement of IIR, NR and SBR. See *Rubber Chemistry and Technology*, Vol. 49, page 1019 and following (1976). Tanaka et al, have reported studies of nitroso benzene in rubber where chain cleavage was observed in Kogyo Kagaku Zasshi 74(8), pages 1701–6 (1971).

U.S. Pat. No. 4,557,306 describes carbon black products comprising carbon black and up to about 10% by weight of at least one aromatic furazan oxide. The carbon black products are useful in rubber compositions particularly filled rubber vulcanizates. U.S. Pat. No. 4,570,620 also describes filled rubber formulations containing aromatic furazan oxides.

Aromatic nitroso compounds are described as additives for rubber compounds in, for example, British Patent 1,185,896, European Patent Application 0,161,791, and U.S. Pat. Nos. 2,901,459, 3,721,659 and 4,624,977, and in various other publications.

SUMMARY OF THE INVENTION

It now has been found that uncured modified rubber compositions comprising mixtures of elastomers, fillers and specified chemical agents can be prepared having improved properties. More particularly, such uncured modified rubber compositions can be prepared by a process which comprises the steps of (A) preparing a first mixture comprising an elastomer, at least one reinforcing filled and at least one chemical agent capable of promoting the formation of filler-elastomer linkages;

(B) preparing a second mixture comprising
  (i) an elastomer, at least one reinforcing filler and at least one chemical agent capable of promoting the formation of filler-elastomer linkages, wherein at least one of the elastomer, filler or chemical agent in the second mixture is different from the elastomer, filler or chemical agent in the first mixture; or
  (ii) an elastomer and at least one reinforcing filler; or
  (iii) at least one reinforcing filler and at least one chemical agent capable of promoting the formation of filler-elastomer linkages; or
  (iv) an elastomer and at least one chemical agent capable of promoting the formation of filler-elastomer linkages; and (C) blending the first and second mixtures to form a third mixture. Examples of such useful chemical agents include aromatic furazan oxides, heterocyclic di-N-oxides, 1-hydroxyenzimidazole-3-oxide compounds, 1,3-dihydroxy-benzimidazolinone compounds, and nitroso compounds.

The invention also includes filled vulcanizates prepared by vulcanizing the uncured modified rubber compositions prepared in accordance with the above method. Rubber articles and portions thereof made from such vulcanizates such as tires, hoses, belts, treads, sidewalls and the like are also within the scope of the present invention as well as methods of reducing the rolling resistance of tires.

DETAILED DESCRIPTION OF THE INVENTION

It has now been discovered that elastomer (or rubber) compositions can be prepared which comprise mixtures of elastomers, fillers and chemical agents capable of promoting the formation of filler-elastomer linkages wherein such rubber compositions are characterized by improved properties. The improvements obtained by the process of the present invention are achieved as a result of the sequential mixing of the above components, namely, the elastomers, fillers and chemical agents. In one embodiment, the process of the present invention may be defined as comprising the steps of (A) preparing a first mixture comprising an elastomer, at least one reinforcing filler and at least one chemical agent capable of promoting the formation of filler-elastomer linkages;

(B) preparing a second mixture comprising
  (i) an elastomer, at least one reinforcing filler and at least one chemical agent capable of promoting the formation of filler-elastomer linkages, wherein at least one of the elastomer, filler or chemical agent in the second mixture is different from the elastomer, filler or chemical agent in the first mixture; or
  (ii) an elastomer and at least one reinforcing filler; or
  (iii) at least one reinforcing filler and at least one chemical agent capable of promoting the formation of filler-elastomer linkages; or
  (iv) an elastomer and at least one chemical agent capable of promoting the formation of filler-elastomer linkages; and (C) blending the first and second mixtures to form a third mixture.

The properties of such uncured rubber formulations, and cured vulcanizates prepared therefrom are improved when compared to rubber formulations wherein the filler and chemical agent are added to an elastomer or mixture of elastomers. The improvement is particularly evident in the cured vulcanizates wherein said cured vulcanizates are characterized by reduced hysteresis (Tan Delta and rebound), and when such cured vulcanizates are utilized in at least the tread of passenger tires, the tires are characterized by a reduction in rolling loss and/or running temperature.

The rubber compositions in the first embodiment of this invention are not cured. In other words, they are not vulcanized. Moreover, in this first embodiment, the uncured rubber compositions of the present invention do not contain conventional curing agents, and most often will not contain any of the normal rubber compounding additives except for the reinforcing filler and the noted chemical agents. The uncured rubber compositions of the present invention generally comprise mixtures of two or more elastomers having different affinities to a reinforcing filler.

As noted above, the process of the present invention involves the preparation of two separate mixtures of the components utilized in the preparation of the modified uncured rubber compositions of the present invention. The components are at least one elastomer, at least one reinforcing filler and at least one chemical agent capable of promoting the formation of filler-elastomer linkages. For convenience, one mixture prepared in accordance with the present invention is designated as a first mixture, and the first mixture generally comprises an elastomer, at least one reinforcing filler, and at least one chemical agent capable of promoting the formation of filler-elastomer linkages. The other mixture utilized in the process of the present invention is identified as a second mixture, and this mixture may comprise various combinations of two or three components identified above. Thus, for example, the second mixture may comprise
  (i) an elastomer, at least one reinforcing filler and at least one chemical agent capable of promoting the formation of filler-elastomer linkages, wherein at least one of the elastomer, filler or chemical agent in the second mixture is different from the elastomer, filler or chemical agent of the first mixture. In other words, when the first and second mixtures comprise all three components, at least one component in the second mixture must be different from the components in the first mixture. For example, the first mixture may contain one type of elastomer and the second mixture contain a different type of elastomer. Alternatively, the fillers in the first and second mixtures may be different or the chemical agents present in the first and second mixtures may be different. In another embodiment, the elastomers and the fillers in both the first and second mixtures may be different.

The second mixture utilized in the process of the present invention also may comprise (ii) an elastomer. and at least one reinforcing filler.

In this embodiment, the elastomer and the reinforcing filler in the second mixture may be the same as the elastomer and reinforcing filler in the first mixture although the elastomer and/or the reinforcing filler in the second mixture generally will be different from the elastomer and reinforcing filler in the first mixture. For example, the first mixture may comprise natural rubber, carbon black, any chemical agent capable of promoting the formation of filler-elastomer linkages, and the second mixture may comprise the same rubber and the same carbon black. Alternatively, the second mixture may comprise a synthetic elastomer and the same or different carbon black.

In another embodiment, the second mixture may comprise (iii) at least one reinforcing filler and at least one chemical agent capable of promoting the formation of filler-elastomer linkages.

In this embodiment, the second mixture does not contain any elastomer, and the reinforcing filler and chemical agent may be the same or different as the filler and chemical agent in the first mixture. The preparation of one type of such mixture is described in U.S. Pat. No. 4,557,306, the disclosure of which is hereby incorporated by reference. A carbon black product is described which is prepared by heating a mixture of carbon black and up to 10% by weight of at least one aromatic furazan oxide.

In yet another embodiment, the second mixture may comprise (iv) an elastomer and at least one chemical agent capable of promoting the formation of filler-elastomer linkages.

As in the above embodiments, the elastomer and chemical agent present in the second mixture may be the same or different from the elastomer and chemical agent present in the first mixture.

The elastomers used herein contain carbon-carbon unsaturation in their molecular structure and these elastomers include natural as well as synthetic rubbers. In this application and in the claims, the terms elastomer and rubber are used interchangeably. The rubber compositions used in the present invention include natural rubber and rubber-like polymers produced by polymerizing aliphatic, conjugated diolefins, especially those containing 4 to 8 carbon atoms per molecule such as butadiene, isoprene, pentadienes, etc., or the copolymers of such dienes. The rubbers used in the uncured compositions of this invention have unsaturated carbon chains. That is, their polymer backbones contain a significant amount of unsaturation, in contrast to the pendant or vinyl saturation found in some other types of rubbers. Typically, the chains of such unsaturated rubbers have at least about 5% of their carbon-to-carbon bonds as unsaturated bonds. Characterization of rubber as having unsaturated carbon chains is well known in the art as shown by ANSI/ASTM Standard D 1418-79A where unsaturated-chain rubbers are referred to as R rubbers. Class R rubbers include natural rubber and various synthetic rubbers derived at least partly from diolefins. The following is a non-exclusive list of R class rubbers which can be used in the compositions of the present invention:

ABR—Acrylate-butadiene
BR—Butadiene
CIIR—Chloro-isobutene-isoprene
CR—Chloroprene
IR—Isoprene, synthetic
NBR—Nitrile-butadiene
NCR—Nitrile-chloroprene
NIR—Nitrile-isoprene
NR—Natural rubber
SBR—Styrene-butadiene
SCR—Styrene-chloroprene
SIR—Styrene-isoprene rubbers The rubbers used herein having carbon-carbon unsaturation also may be other than the R rubbers such as EPDM. EPDM rubbers are derived from ethylene-propylenediene monomer and generally about 3-8% of their carbon bonds are unsaturated bonds.

The process of the present invention comprises preparing two or more mixtures, one mixture comprising at least one elastomer, at least one filler and at least one chemical agent capable of promoting the formation of filler-elastomer linkages and a second mixture comprising various combinations of two of the components or all three components.

In one embodiment of the invention, the modified rubber compositions of the present invention comprise mixtures of any two or more of the above elastomers provided that two or more of the elastomers have different affinities for at least one of the reinforcing fillers which are incorporated therein. Thus, the mixtures of elastomers or rubbers included in the compositions of the present invention may be mixtures of synthetic elastomers or mixtures of natural rubber with synthetic elastomers. Of the synthetic elastomers, the IR, BR, SBR, CR, CIIR, or the NIR elastomers are the most typically utilized. The two or more elastomers included in the uncured rubber compositions of the invention may be present in varying amounts. For example, the first elastomer may comprise from about 10 parts to about 90 parts of the composition and the second elastomer may comprise from about 90 to about 10 parts by weight of the compositions of the invention.

In one preferred embodiment of the present invention, the rubber mixture utilized to form the compositions of the present invention comprise mixtures of natural rubber and one or more synthetic rubbers. Of the synthetic rubbers, SBR is preferred. When the compositions of the present invention comprise mixtures of natural rubber and synthetic rubbers, the mixture generally will contain from about 60 to about 30 parts by weight of natural rubber and from about 40 to about 70 parts by weight of the synthetic rubber or elastomer.

The first mixture and optionally the second mixture prepared in accordance with the process of this invention include reinforcing fillers normally used in rubber formulations such as carbon blacks, talcs, silica and other finely divided mineral materials. The carbon blacks include any of the commonly available. commercially-produced carbon blacks but those having a surface area (EMSA) of at least 20 $m^2/g$. and more preferably at least 35 $m^2/g$. up to 200 $m^2/g$. or higher are preferred. Surface area values used in this application are those determined by ASTM test D-1765 using the cetyltrimethyl-ammonium bromide (CTAB) technique.

Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which may be utilized include acetylene blacks. Mixtures of two or more of the above blacks can be used in preparing the mixtures and compositions of the invention. Typical values for surface areas of usable carbon blacks are summarized in the following Table I.

TABLE I

| ASTM Designation (D-1765-82a) | Surface Area ($m^2/g$) (D-3765) |
| --- | --- |
| N-110 | 126 |
| N-220 | 111 |
| N-339 | 95 |
| N-330 | 83 |
| N-550 | 42 |
| N-660 | 35 |

The carbon blacks utilized in the preparation of the filled vulcanizates of the invention may be in pelletized form or an unpelletized flocculant mass. Preferably, for more uniform mixing, unpelletized carbon black is preferred.

The first mixture and optionally the second mixture prepared in accordance with the process of the present invention include, in addition to the elastomer and/or the filler, at least, one chemical agent capable of increasing the filler-elastomer interaction, and more particularly, of promoting the formation of filler-elastomer linkages. A large number of chemical agents have been described in the elastomer art which are capable of promoting this interaction and linkage formation. Any such chemical agents can be utilized in the mixtures of the present invention. The chemical agents generally are compounds which, when incorporated into uncured filled elastomer formulations will result in the formation of filled rubber vulcanizates exhibiting many improved properties such as decreased hysteresis. Thus, in one embodiment the chemical agents useful in the process of the present invention are those which are commonly referred to as hysteresis improvers or promoters in rubber formulations. Some examples of chemical agents which have been described in the art as being hysteresis promoters or improvers and which are useful in the process of the present invention include (A) aromatic furazan oxides,
(B) aromatic heterocyclic di-N-oxides,
(C) 1-hydroxy benzimidizole 3-oxide compounds,
(D) 1,3-dihydroxy-benzimidazolinone compounds, and
(E) organic nitroso compounds.

The chemical agents used in the first and second mixtures in the method of the present invention may be the same or different chemical agents. Generally, however, the same chemical agent will be utilized in the first and second mixtures.

The furazan oxides which may be used in preparing the first and second mixtures used in the method of this invention are fused aromatic, i.e., they have an aromatic ring fused to the N-oxidized heterocyclic furazan ring. They are of the partial formula

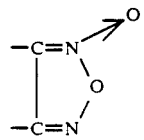

(I)

wherein the depicted carbon atoms are part of a fused, single aromatic ring. This aromatic ring can be carbocyclic such as a benzene ring or it may be heterocyclic, such as a pyridine ring. It can be the only additional ring in the furazan compound, or it can be part of a linked or fused ring system. It is only necessary that both of the depicted carbon atoms are part of the same aromatic ring.

Preferred examples of the furazan oxides within the scope of Formula I useful in preparing the uncured-modified rubber compositions of this invention are those that can be represented by the Formulae IA-ID.

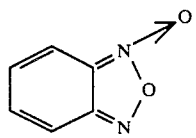

(IA)

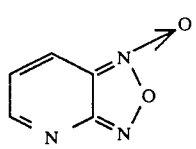

(IB)

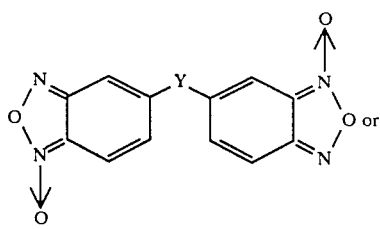

(IC)

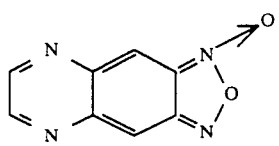

(ID)

wherein none, one or any two of the ring positions can be substituted with lower hydrocarbyl, halogen, hydroxyl, lower hydrocarbyloxy, lower hydrocarbylthio, lower hydrocarbyl carbonyl, carbonyl lower hydrocarbyloxy, nitro, amino or amine groups and Y is a linking atom or group. In this context, lower hydrocarbyl refers to groups containing carbon and hydrogen having 8 or less carbon atoms such as methyl, ethyl, butyl, pentyl, heptyl, octyl (all isomers). Linking atoms or groups Y include ether, thio ether, sulfoxide, sulfone, amine, methylene and the like (including a simple covalent bond such as found in biphenyl) and the other linking groups shown in U.S. Pat. No. 3,528,098 (which is incorporated by reference herein for its disclosures in this regard). Hydrocarbyloxa, hydrocarbylthia and mixed hydrocarbyloxathia substituents are also possible where the hydrocarbyl groups are typically lower alkylene moieties. Such are often made from glycols, dithiols, epoxides and episulfides. Often the furazan oxide is a benzofurazan oxide of the formula

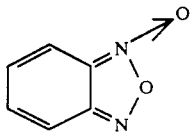 (IA)

wherein none, one or any two of the ring positions can be substituted with lower hydrocarbyl, halogen, lower hydrocarbyloxy, lower hydrocarbylthio, lower hydrocarbyl carbonyl, carbonyl lower hydrocarbyloxy, nitro, amine or amino groups. Typically, the furazan oxide is benzofurazan oxide or the methyl or methoxy analog thereof.

Methods for preparing, purifying and handling these compounds are known to the art as is shown by the references cited hereinabove. The preparation of halogenated benzofurazan oxides and other substituted derivatives is described by Boulton et al in *J. Chem. Soc.* (1965) 5958. Benzotri (furazan oxide) can be prepared by the method described by Barley and Case in *Tetrahedron*, 3 (1958) 113. It should be noted that some of these furazan oxides, particularly those containing relatively large amounts of nitrogen and oxygen, such as benzotri (furazan oxide) and 4,6-di-(nitro)benzofurazan oxide, are prone to rapid decomposition to the point of explosions; all may be physiologically active to varying degrees. Therefore, care in their handling and use should be exercised.

In another embodiment, the chemical agent capable of promoting the formation of filler-elastomer linkages may be a heterocyclic di-N-oxide. In general, the heterocyclic di-N-oxide compounds are defined as compounds whose structure comprises a six-membered hetero aromatic ring consisting of 4 carbon atoms and 2 nitrogen atoms in the 1,4-position of the ring, both nitrogen atoms being oxidized to N-oxide groups. In one embodiment, such compounds are represented by the following formula

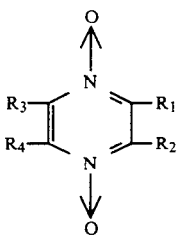 (II)

wherein $R_1$, $R_2$, $R_3$ and $R_4$ may be hydrogen, hydrocarbyl, hydrocarbyloxy, halogen, halohydrocarbyl, hydrocarbyl sulfonyl, hydrocarbyl thio, hydrocarbyl sulfoxide, amino, cyano,

—OH

—CHO

—CH(O hydrocarbyl)$_2$

—C(O)R$^5$

—C(O)OR$^5$

—C(N—OH)R$^5$

—C(O)NR$^5$R$^8$

—CH=N—NH—C(O)OR$^5$

—CH$_2$OC(O)CH$_3$

—R$^6$YR$^5$

—C(O)NHR$^6$OH

—C(NH)NR$^9$R$^{10}$, or

—C(O)NHN(R$^5$)$_2$ wherein each $R^5$ is independently hydrogen or a hydrocarbyl group, $R^6$ is a divalent hydrocarbyl group, $R^8$ is hydrogen, hydrocarbyl, —R$^6$OR$^5$, or —R$^6$COOR$^5$; $R^9$ is hydrogen or a hydrocarbyl group; $R^{10}$ is hydrogen or a hydrocarbyl, an amino, or a hydroxyl group; $R^9$ and $R^{10}$ may be hydrocarbyl groups joined together to form a ring including the nitrogen atom, and Y is O, divalent S, —NH—, —S(O)— or —S(O)$_2$, or $R^5$ and $R^6$ may be joined together to form a ring including the nitrogen atom, and Y is O or divalent S, or $R^1$ and $R^2$ and/or $R^3$ and $R^4$ may be joined together to form further ring systems which may be saturated or unsaturated, and further substituted or unsubstituted.

In one preferred embodiment, the aromatic heterocyclic di-N-oxide compounds characterized by the formula

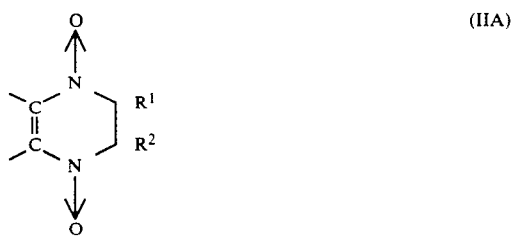 (IIA)

wherein the depicted carbon atoms are part of an optionally-substituted aromatic ring, and $R^1$ and $R^2$ are as defined above with respect to Formula II.

In the above Formula IIA, any one or two of any ring positions which may be present can be substituted with halogen and/or hydroxyl, cyano hydrocarbyl, hydrocarbyloxy, hydrocarbylthio, hydrocarbylcarbonyl, nitro, amino-C(O)-hydrocarbyl or ester groups. The hydrocarbyl groups may be alkyl, aryl, alkaryl, aralkyl, etc., and the hydrocarbyloxy groups may be the corresponding alkoxy, aryloxy, etc. groups.

The group $R^5$ may be a lower hydrocarbyl group as defined above or a higher hydrocarbyl group such as an aliphatic group containing from 8 to 30 carbon atoms including decyl, dodecyl, tridecyl, hexadecyl, etc. The group $R^6$ is a divalent hydrocarbyl group and is generally a divalent lower hydrocarbyl group such as methylene, ethylene, propylene, etc.

Examples of various aromatic heterocyclic di-N-oxide compounds which are illustrative of Formula IIA can be represented by the following formulae

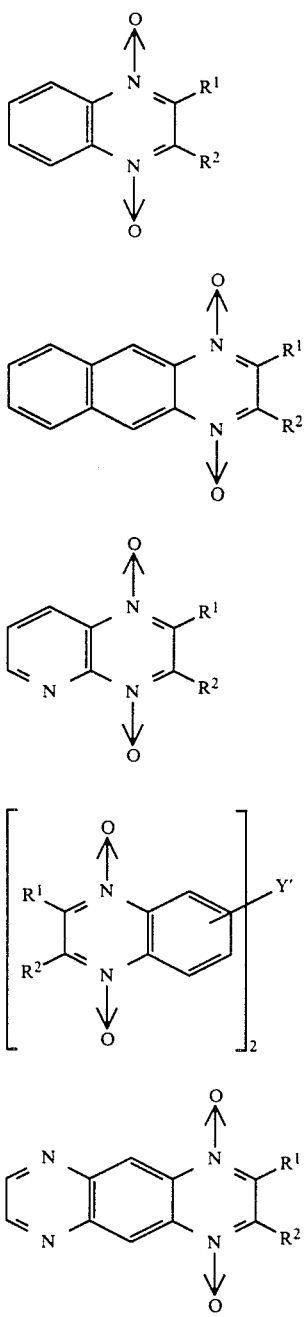

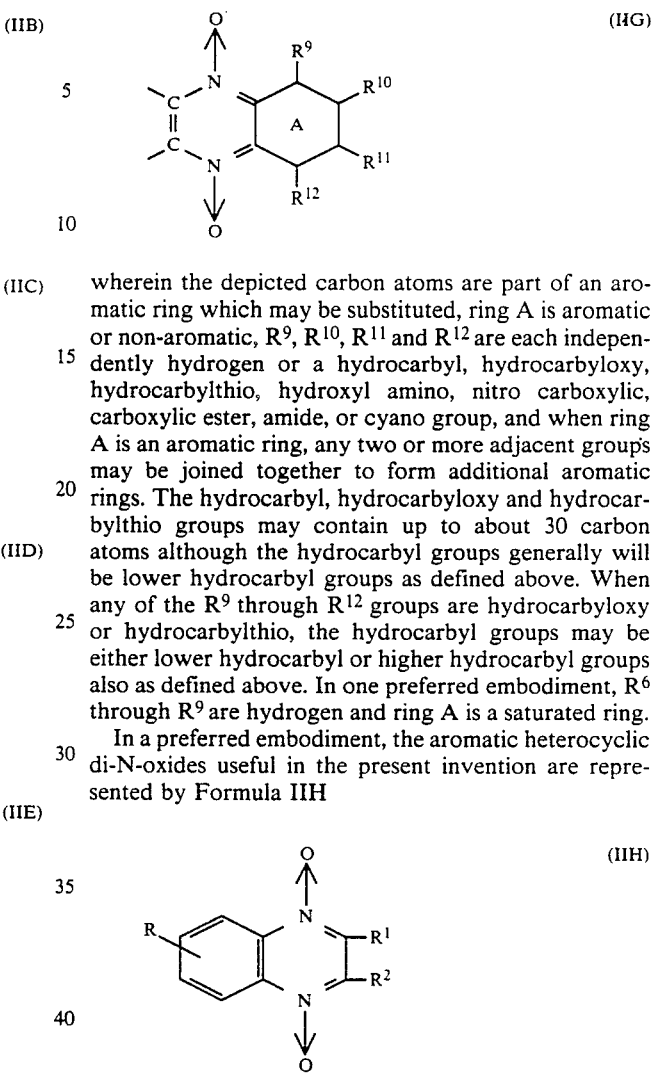

wherein $R^1$ and $R^2$ are as defined with respect to Formula II and wherein, none, one, or any two of the other ring positions can be substituted with hydrocarbyl, hydrocarbyloxy, hydrocarbylthio, hydroxyl, halogen, cyano, nitro, amino, amide, ester or —C(O)-hydrocarbyl groups, and Y' is a linking atom or group. Linking atoms of groups (Y') include ether, thioether, sulfoxide, sulfone, amine, methylene, etc. (including simple covalent bonds such as found in biphenyl).

As mentioned above, $R^1$ and $R^2$ in Formula II may be hydrocarbyl groups joined together to form further ring systems which may be saturated or unsaturated and further substituted or unsubstituted. Such compounds may be represented by the following Formula IIG wherein the depicted carbon atoms are part of an aromatic ring which may be substituted, ring A is aromatic or non-aromatic, $R^9$, $R^{10}$, $R^{11}$ and $R^{12}$ are each independently hydrogen or a hydrocarbyl, hydrocarbyloxy, hydrocarbylthio, hydroxyl amino, nitro carboxylic, carboxylic ester, amide, or cyano group, and when ring A is an aromatic ring, any two or more adjacent groups may be joined together to form additional aromatic rings. The hydrocarbyl, hydrocarbyloxy and hydrocarbylthio groups may contain up to about 30 carbon atoms although the hydrocarbyl groups generally will be lower hydrocarbyl groups as defined above. When any of the $R^9$ through $R^{12}$ groups are hydrocarbyloxy or hydrocarbylthio, the hydrocarbyl groups may be either lower hydrocarbyl or higher hydrocarbyl groups also as defined above. In one preferred embodiment, $R^6$ through $R^9$ are hydrogen and ring A is a saturated ring.

In a preferred embodiment, the aromatic heterocyclic di-N-oxides useful in the present invention are represented by Formula IIH

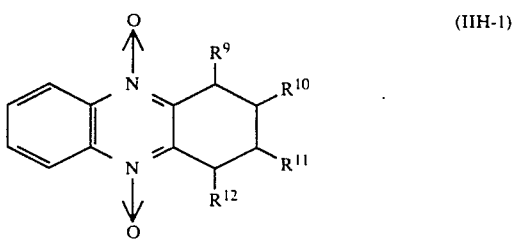

wherein $R^1$ and $R^2$ are as defined in Formula II and R is hydrogen or a hydrocarbyl, hydrocarbyloxy, hydrocarbylthio, hydroxyl, halogen, cyano, amino, amide, ester or —C(O)-hydrocarbyl group.

As mentioned, $R^1$ and $R^2$ in Formula IIH may be hydrocarbyl groups joined together to form further ring systems which may be illustrated by the following formulae wherein $R^9$, $R^{10}$, $R^{11}$, and $R^{12}$ are as defined with respect to Formula IIG above and wherein none, one or any two of the aromatic ring positions may be substituted with a hydrocarbyl, hydrocarbyloxy, hydrocarbylthio, hydroxyl, halogen, cyano, nitro, amino or —C(O)-hydrocarbyl groups;

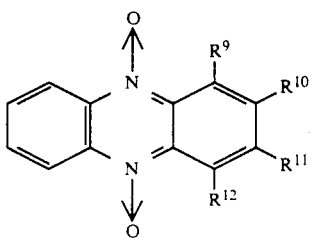

(IIH-2)

wherein $R^9$, $R^{10}$, $R^{11}$, and $R^{12}$ are as defined above with respect to Formula IIG, and wherein none, one or any two of the other aromatic positions can be substituted with hydrocarbyl, halogen, hydroxyl, hydrocarbyloxy, hydrocarbylthio, hydrocarbylcarbonyl, amino, amide, ester, or —C(O)-hydrocarbyl groups, and any two or more adjacent R groups may be joined together to form additional aromatic rings; and

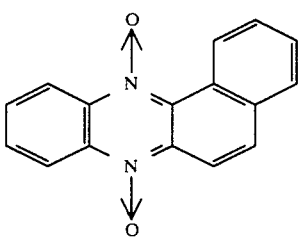

(IIH-3)

wherein none, one, or any of the ring positions can be substituted with hydrocarbyl, hydrocarbyloxy, hydrocarbylthio, halogen, hydroxyl, hydrocarbyl carbonyl, nitro, sulfonyl, carboxyl, or amino groups.

In another embodiment of the invention, the heterocyclic di-N-oxide is further characterized by the formula

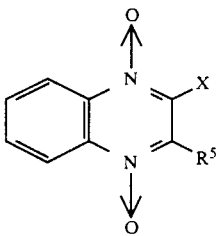

(II-J)

wherein X is —OH, —CN, —C(O)OR$_3$, —C(-N—OH)R$^3$, —CHO, —CH(O-hydrocarbyl)$_2$, —C(O)NHR$^6$, —C(O)NHN(R$^3$)$_2$, —R$^4$YR$^3$, —C(NH)NR$^7$R$^8$, or —C(O)NHR$^4$OH; R$^5$ is X, hydrogen, a hydrocarbyl, a halohydrocarbyl or hydrocarbyloxy group; R$^3$ is hydrogen or a hydrocarbyl group; R$^4$ is a divalent hydrocarbyl group; R$^6$ is hydrogen, —R$^4$COOR$^3$ or —R$^4$YR$^3$; R$^7$ is hydrogen or a hydrocarbyl group; , R$^8$ is hydrogen or a hydrocarbyl, an amino, or a hydroxyl group; or R$^7$ and R$^8$ may be hydrocarbyl groups joined together to form a ring system including the nitrogen atom, and Y is O or divalent S; or X and R$^5$ are hydrocarbyl groups joined together to form further ring systems which are saturated or unsaturated, and further substituted or unsubstituted. Further examples of di-N-oxides of the type represented by Formula II-J include the compounds contained within Formulae IIB and IIH by substituting X and R$^5$ for R$^1$ and R$^2$, respectively.

The aromatic heterocyclic di-N-oxides useful as chemical agents in the present invention can be prepared by methods known in the art. For example, heterocyclic di-N-oxides can be prepared from various benzofurazan-N-oxides by reacting the furazan N-oxides with, for example, aldehydes, ketones, enamines, enolate anions, etc. This reaction has become known as the Beirut reaction and extensive reviews of such reactions have been published. See, for example, M. J. Haddadin et al, Tetrahedron, 32, 719 (1976); K. Ley and F. Seng, Synthesis, 415–422 (1975); M. J. Haddadin et al, Heterocycles 4, 767 (1976); M. J. Haddadin, and G. H. Issidorides, J. Org. Chem. 37, 589 (1972); J. W. McFarland, J. Org. Chem. 36, 1842 (1971); E. Abushanab J. Org. Chem. 35 4279 (1970); and A. Gasco and A. J. Boulton, Advances in Heterocyclic Chem., Vol. 29, 306 Academic Press, 1981. The disclosures of these publications relating to the preparation of various heterocyclic di-N-oxides of the types represented by Formulae II through IIJ, are hereby incorporated by reference.

Specific examples of aromatic heterocyclic di-N-oxides which have been described in the literature and which can be used in the process of this invention in preparing the uncured rubber compositions of the present invention include those identified in the following Table II.

TABLE II

HETEROCYCLIC DI-N-OXIDES
Example H-1 to H-46

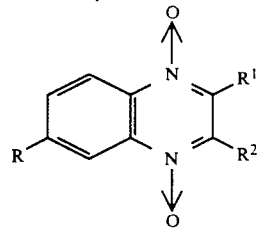

| | R$^1$ | R$^2$ | R |
|---|---|---|---|
| H-1 | CN | CH$_3$ | H |
| H-2 | —C(O)NHC$_2$H$_4$OH | CH$_3$ | H |
| H-3 | —C(O)NHC$_3$H$_7$ | CH$_3$ | OCH$_3$ |
| H-4 | C(N—OH)—CH$_3$ | CH$_3$ | H |
| H-5 | CH$_2$SC$_{12}$H$_{25}$ | CH$_3$ | H |
| H-6 | OH | CH$_3$ | H |
| H-7 | CH$_2$OC$_{12}$H$_{25}$ | CH$_3$ | H |
| H-8 | CH$_3$ | CH$_3$ | H |
| H-9 | CH(CH$_3$)$_2$ | CH$_3$ | H |
| H-10 | C(O)CH$_3$ | CH$_3$ | H |
| H-11 | H | H | H |
| H-12 | SCH$_3$ | CH$_3$ | H |
| H-13 | S(O)CH$_3$ | CH$_3$ | H |
| H-14 | S—C$_6$H$_5$ | CH$_3$ | H |
| H-15 | CN | NH$_2$ | CH$_3$ |
| H-16 | CN | OH | CH$_3$ |
| H-17 | H | CH$_3$ | H |
| H-18 | C$_2$H$_5$ | CH$_3$ | OCH$_3$ |
| H-19 | CH$_3$ | CH(CH$_3$)$_2$ | C(O)NH$_2$ |
| H-20 | CH$_3$ | C$_8$H$_{12}$ | H |
| H-21 | C$_{15}$H$_{33}$ | CH$_3$ | H |
| H-22 | C(O)NH$_2$ | NH$_2$ | H |
| H-23 | C(O)NH$_2$ | C(O)NH$_2$ | H |
| H-24 | C(O)NH$_2$ | OH | CH$_3$ |
| H-25 | C(NH)NHOH | OH | H |
| H-26 | C(NH)NHNH$_2$ | NH$_2$ | H |
| H-27 | C(NH)—N | CH$_3$ | CH$_3$ |
| H-28 | C(NH)N(CH$_3$)$_2$ | OH | H |
| H-29 | OH | OH | OC$_2$H$_5$ |
| H-30 | CH$_3$ | C(O)NHC$_2$H$_4$OCH$_3$ | H |
| H-31 | CH$_3$ | C(O)NHCH$_2$COOH | H |
| H-32 | CH$_3$ | C(O)CH$_3$ | H |
| H-33 | CH$_2$Cl | C(O)NHN(CH$_3$)$_2$ | H |
| H-34 | CH$_3$ | COOEt | H |

TABLE II-continued

| | | | |
|---|---|---|---|
| H-35 | H | CHO | H |
| H-36 | H | CH(OMe)$_2$ | H |
| H-37 | CH(OMe)$_2$ | CHO | H |
| H-38 | CH$_2$Cl | C(O)NHCH$_3$ | H |
| H-39 | p-NO$_2$C$_6$H$_4$— | H | H |
| H-40 | p-BrC$_6$H$_4$ | H | H |
| H-41 | COCH$_3$ | C$_6$H$_5$ | H |
| H-44 | CH$_3$ | CH$_3$ | CONH$_2$ |
| H-45 | CH$_3$ | CH$_3$ | C(O)OCH$_3$ |
| H-46 | CH$_3$ | CH$_3$ | Cl |

Example H-47A       47B

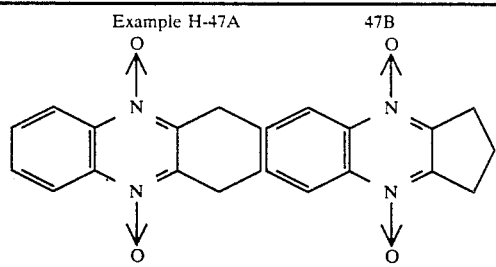

Example H-48

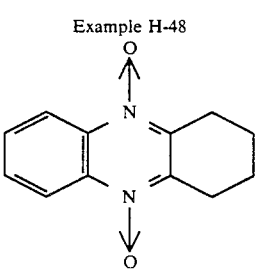

Example H-49

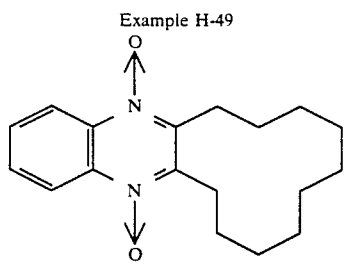

Example H-50 to H-64

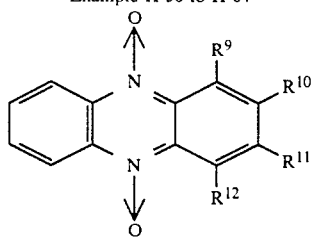

| | R$^9$ | R$^{10}$ | R$^{11}$ | R$^{12}$ |
|---|---|---|---|---|
| H-50 | H | OH | H | Cl |
| H-51 | H | OH | H | H |
| H-52 | H | OH | CH$_3$ | H |
| H-53 | H | OH | C(CH$_3$)$_3$ | H |
| H-54 | H | OH | H | COCH$_3$ |
| H-55 | H | OH | CH$_3$ | CH$_3$ |
| H-56 | COCH$_3$ | OH | H | H |
| H-57 | NO$_2$ | OH | H | H |
| H-58 | H | NH$_2$ | H | H |
| H-59 | H | OH | OH | H |
| H-60 | H | —OCH$_2$O— | | H |
| H-61 | H | OH | OCH$_3$ | H |
| H-62 | H | OH | H | OH |
| H-63 | H | OH | OH | CH$_3$ |
| H-64 | H | OH | CO$_2$CH$_3$ | H |

Examples H-65 to H-73

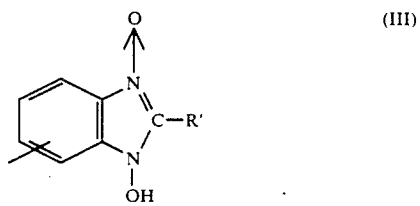

| | R$^{13}$ | R$^{14}$ | R$^{15}$ | R$^{16}$ |
|---|---|---|---|---|
| H-65 | H | H | H | H |
| H-66 | H | H | H | COOH |
| H-67 | H | H | H | NH$_2$ |
| H-68 | NHSO$_2$CH$_3$ | H | H | H |
| H-69 | NHCOCH$_3$ | H | H | H |
| H-70 | H | NO$_2$ | SO$_3$Na | H |
| H-71 | NH$_2$ | SO$_3$H | H | H |
| H-72 | H | SO$_3$Na | H | SO$_3$Na |
| H-73 | SO$_3$Na | H | H | COOH |

Example H-74

Example H-75

The chemical agent capable of promoting the formation of filler-elastomer linkages also may be at least one 1-hydroxy-benzimidazole 3-oxide compound of the formula (III)

wherein R is hydrogen, or a halogen, hydroxyl, lower acyl, lower hydrocarbyl, lower hydrocarbyloxy, lower hydrocarbylthio, carboxyl, cyano, amino, amide or —C(O)-lower hydrocarbyl group, and R' is hydrogen, or a lower hydrocarbyl, lower hydrocarbyl amide, carboxamide carboxy acid, carboxy ester, or aryl group.

The hydrocarbyl groups R and R' may be alkyl, aryl, alkaryl, aralkyl, etc., and the hydrocarbyloxy groups may be the corresponding alkoxy, aryloxy, etc. groups. More generally, the hydrocarbyl groups are lower alkyl group containing up to about 8 carbon atoms such as methyl, ethyl, n-propyl, isopropyl, n-butyl, isobutyl, pentyl, etc. It is preferred that R is hydrogen, methyl, or methoxy, and in a particularly preferred embodiment, R is hydrogen.

It is preferred that R' is hydrogen or a lower hydrocarbyl as defined above, and generally, R' is a lower hydrocarbyl such as a methyl or ethyl group.

The hydroxy-benzimidazole oxides useful in this invention and represented by Formula III can be prepared by methods known in the art. For example, benzimidazoles can be prepared by the reaction of benzofurazan oxides with a primary nitroalkane, a beta-keto-sulfone, an alpha-sulfonyl carboxylic acid ester, or an alpha-sulfonyl carboxamide, said benzofurazan oxide being characterized by the following Formula IIIA

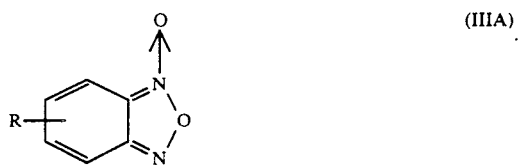
(IIIA)

wherein R is hydrogen, or a halogen, hydroxyl, lower hydrocarbyl, halohydrocarbyl lower hydrocarbyloxy, lower hydrocarbylthio, carboxyl, cyano, amino, amide or —C(O)-lower hydrocarbyl group. Such reactions are described in the literature and are reported to form 1-hydroxy benzimidazole 3-oxides and possibly minor amounts of other nitrogen- and oxygen-containing materials. Compositions comprising such reaction products including the 1-hydroxy-benzimidizole 3-oxides of Formula III are useful in modifying the rubbers in accordance with the process of the present invention. For convenience, the reaction of the benzofurazan oxide with a primary nitroalkane, a beta-ketosulfone, or an alpha-sulfonyl carboxylic acid ester or carboxamide is represented below as forming the 1-hydroxy-benzimidazole 3-oxide.

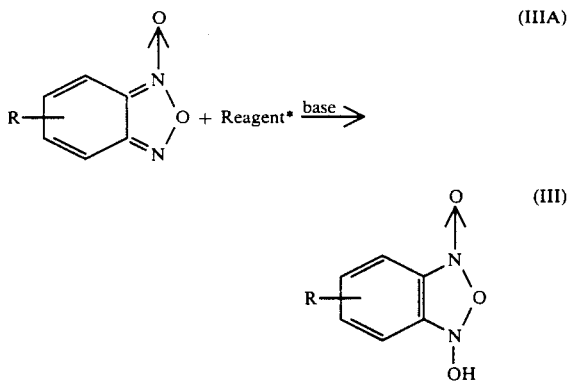

Reagent*

R'CH₂NO₂; R'=H, hydrocarbyl, hydrocarbyl amide, carboxy ester;
or
PhSO₂C(R')HC(O)Ph; R'=H, hydrocarbyl;
or
PhSO₂CH₂R'; R'=carboxamide, carboxy ester.

The reactions are conducted in the presence of a base.

The procedure for preparing 1-hydroxy-1-H-benzimidazole 3-oxides by the reaction of about equimolar amount of benzofurazan oxide with primary nitroalkanes such as represented by the formula

R'CH₂NO₂ in tetrahydrofuran in the presence of organic amine bases at temperatures of from about ambient temperature up to about 50°-60° C. is described in the literature such as, for example, J. Org. Chem., Vol. 37, No. 15, 1972, pp. 2519-2520, and A. Gasco and A. J. Boulton, Advances in Heterocyclic Chemistry, Vol. 29, pp. 310-311, Academic Press 1981. The contents of these publications are hereby incorporated by reference for their disclosures of the preparation of 1-hydroxy-benzimidazole oxides useful in the present invention.

Briefly, benzofurazan oxide reacts exothermically with primary nitroalkanes in tetrahydrofuran and in presence of organic amine bases to form the desired 2-substituted 1-hydroxy-benzimidazole 3-oxides and nitrite salts of the amines. For example, if diethylamine is used as the base, the by-product is the nitrite of diethylamine.

In the typical procedure, 0.1 mole of benzofurazan 1-oxide and 0.12 mole of nitroethane is dissolved at 100 ml. of tetrahydrofuran. To this mixture there is added at room temperature, 0.12 mole of diethylamine over a period of 0.5 hour. An instantaneous exothermic reaction is observed (40° C.) and within one hour, the product crystallizes from the solution. The solution is allowed to stand overnight at room temperature and filtered to yield 9.6 grams of 2-methyl-1-hydroxy-1-H-benzimidazole 3-oxide (Table III, Example H-77). The product can be recrystallized from methanol.

The preparation of hydroxy-benzimidazole 3-oxides useful in the present invention by reaction of about equimolar amounts of benzofurazan oxide with beta-ketosulfones alpha-sulfonyl carboxamides, and alpha-sulfonyl carboxylic esters in an alkaline medium at temperatures of from ambient temperature to about 50°-60° C. is described in J. Org. Chem., Vol. 37, No. 15, 1972, pp. 2372-2376, and A. Gasco and A. J. Boulton, Advances in Heterocyclic Chemistry, Vol. 29. pp. 310-311, Academic Press 1981. The contents of the references are hereby incorporated for the disclosure of the preparation of various benzimidazole oxides useful in the present invention.

Examples of beta-ketosulfones which can be reacted with benzofurazan oxides in alkaline media include 2-benzene sulfonyl acetophenone, and 2-alkyl-2-benzene sulfonyl acetophenones wherein the alkyl group is, for example, a lower hydrocarbyl group such as methyl, ethyl, butyl, etc. Examples of alpha-sulfonyl carboxamides which can be reacted with furazan oxides include 2-benzene sulfonyl acetamides wherein R' may be —C(O)NH₂; —C(O)NHPh; —C(O)N(Et)₂; —C(O)N(i-Pr)₂; —C(O)NCH₃Ph; —C(O)OH; and —C(O)OEt. The base utilized to promote the reaction generally is an alkali metal hydroxide such as sodium or potassium hydroxide dissolved in an alcohol such as methanol or ethanol. An example of an alpha-sulfonyl carboxylic ester which can be reacted with benzofurazan oxides is ethyl 2-benzene sulfonyl acetate.

The general procedure for the reaction of benzofurazan oxide with beta-carbonyl sulfones is as follows: A mixture of 0.02 mole of the beta-carbonyl sulfone, 5.44 grams (0.04 mole) of benzofurazan oxide and 50 ml. of methanol is prepared and crystals are dissolved by warming the mixture. An 8% methanolic KOH solution (50 ml.) is added and the mixture maintained at room temperature for 12 hours. The reaction mixture is filtered, and the filtrate is evaporated to dryness whereupon 15 ml. of water is added to the residue. Stirring and cooling results in the crystallization of potassium salt by-products, and the mixture is filtered. This filtrate is neutralized with concentrated hydrochloric acid until a few droplets of oil are formed. The oil is extracted with ether and the aqueous layer separated and neutralized further with concentrated hydrochloric acid to form an oily precipitate. The precipitate is triturated with acetone to give fairly pure crystals of the 1-hydroxy-3-oxobenzimidazole derivatives. The products are soluble in acidic and basic media and insoluble in acetone. The products can be recrystallized from methanol, ethanol, and/or water.

When 2-alkyl-2-benzene sulfonyl acetophenones are reacted with a benzofurazan oxide, the reaction mixture is warmed to 40°–60° C. for 8 hours and then worked up as described above. The reaction mixture prepared utilizing 2-benzene sulfonyl acetamide (R′=CONH$_2$) is warmed for 30 minutes and then worked up as described above.

The reaction mixture of benzofurazan oxide with ethyl 2-benzene sulfonyl acetate is warmed to 50° C. for 3 hours, and the resulting 1-hydroxy-3-oxobenzimidazole-2-carboxylic acid is recrystallized by dissolving it several times in 1% KOH solution and neutralizing with hydrochloric acid.

Compounds corresponding to Formula III wherein R′ is an aryl group, and more specifically where R′ is a phenyl group can be prepared from nitroso and nitrile de compounds as described in Houben Weyl, *Methoden der Organischen Chemie*, Vol. X/III, page 868.

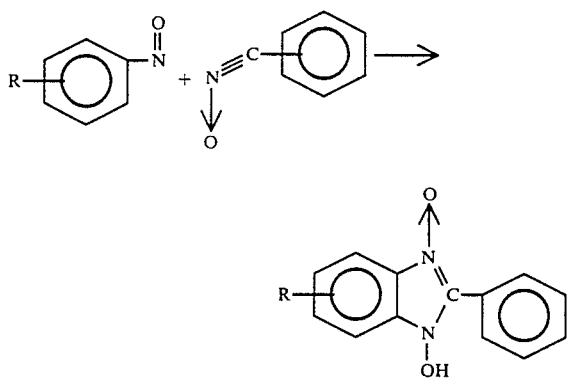

The rubber compositions also can be modified in accordance with one embodiment of this invention by including in the rubber, a property-improving amount of the product or product mixture obtained in the above described reaction of benzofurazan oxides (IIIA) with the above-described reagents. Although preferred, it is not essential that the products identified as (III) above be isolated from the remainder of the reaction products.

Specific examples of 1-hydroxy-benzimidazole 3-oxides which can be used to modify rubber compositions in accordance with this invention are illustrated in the following Table III.

TABLE III

1-Hydroxybenzimidazole 3-Oxides

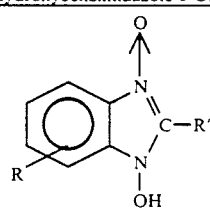

| Example | R | R′ |
|---------|---|-----|
| H-76 | H | —H |
| H-77 | H | —CH$_3$ |
| H-78 | H | —CH$_2$CH$_3$ |
| H-79 | H | —CH$_2$CH$_2$CONH$_2$ |
| H-80 | H | —CO$_2$CH$_2$CH$_3$ |
| H-81 | H | —CH$_2$CH$_2$CH$_2$CH$_3$ |
| H-82 | H | —CONH$_2$ |
| H-83 | H | —CON(C$_2$H$_5$)$_2$ |
| H-84 | H | —CON(iPr)$_2$ |
| H-85 | H | —COOEt |
| H-86 | H | —C(O)N(CH$_3$)Ph |
| H-87 | H | —C(O)NHPh |
| H-88 | H | —C$_6$H$_5$ |
| H-89 | H | cyclohexyl |

EXAMPLES H-90–103

These compounds are similar to Examples H-76 to H-89 except R is —CH$_3$ in lieu of H.

The chemical agents useful in this invention for promoting the formation of filler elastomer linkages also may be characterized by the formula

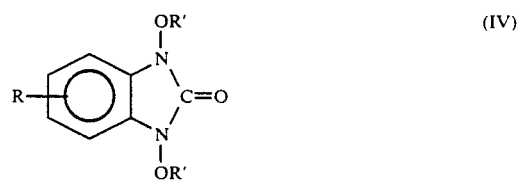

(IV)

wherein R is hydrogen, or a halogen, hydroxyl, lower hydrocarbyl, lower hydrocarbyloxy, lower hydrocarbylthio, lower hydrocarbyl nitrile, carboxyl, cyano, nitro, amino, amide or —C(O)—R‴ where R‴ is an aryl or a lower hydrocarbyl group; each R′ independently is H, lower alkyl, acyl, CONR″$_2$ or CONHR″ where R″ is alkyl or aryl. In one preferred embodiment, R is in the five-position.

The hydrocarbyl groups may be alkyl, aryl, alkaryl, aralkyl, etc., and the hydrocarbyloxy groups may be the corresponding alkoxy, aryloxy, etc. groups. More generally, the hydrocarbyl group is a lower alkyl group containing up to about 8 carbon atoms such as methyl, ethyl, n-propyl, isopropyl, n-butyl, isobutyl, pentyl, etc. It is preferred that R is hydrogen, methyl, or methoxy, and in a particularly preferred embodiment, R is hydrogen.

The benzimidazolinones useful in this invention and represented by Formula IV can be prepared by methods known in the art. For example, dihydroxy-benzimidazolinones (IVA) can be prepared by the reaction of benzofurazan oxides with formaldehyde in the presence of alkali. The reaction proceeds exothermically as illustrated in the following equation, wherein R is as defined above in Formula IV.

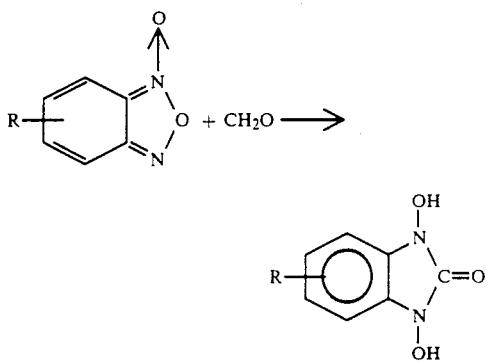

The term "formaldehyde" as used in this specification and in the appended claims, includes formaldehyde in its various forms including paraformaldehyde, s-trioxane, alpha-trioxymethylene, formalin, methanal, etc. This reaction is described in more detail by Seng and Ley, *Angew. Chem.* International Ed., Vol. 11 (1972), p. 1009. The disclosure of this publication is incorporated herein for its description of the preparation of several 1,3-dihydroxy-benzimidazolinones (IVA).

The derivative compositions IV can be prepared from the dihydroxy-benzimidazolinones (IVA) by alkylation, acetylation, addition of isocyanates or acrylonitrile of/to the hydroxy groups. These reactions are known to those in the art.

The rubber compositions also can be modified in accordance with one embodiment of this invention by including in the first and/or second mixtures, a property-improving amount of the product or product mixture obtained in the above described reaction of benzofurazan oxides with formaldehyde in the presence of a base, and/or the above-described derivatives. Although preferred, it is not essential that the products identified as (IV) or (IVB) above be isolated from the remainder of the reaction products.

Specific examples of 1,3-dihydroxy-benzimidazolinones and derivatives which can be used as chemical agents in the rubber compositions of this invention are illustrated in the following Tables IV and V.

TABLE IV

DIHYDROXY-BENZIMIDAZOLINONES (IVA)

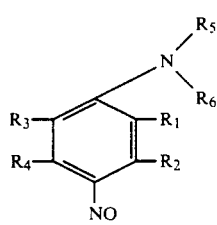

| Example | R | Decomposition point (°C.) |
|---|---|---|
| H-104 | —H | 227 |
| H-105 | —Cl | 206 |
| H-106 | —CH₃ | 209 |
| H-107 | —OCH₃ | 153 |
| H-108 | —COOH | 260 |
| H-109 | —CONH₂ | 220 |

The procedure for preparing the above compositions is illustrated with the preparation of 1,3-dihydroxy benzimidazolin-2-one (Example H-104)

Benzofuroxan (136 g., 1 mole) is suspended in 50 ml of methanol and treated with 100 g. (1 mole) of 30% aqueous formaldehyde. A solution of 114 g. (2 moles) of potassium hydroxide in 100 ml. of water then is added dropwise while maintaining the reaction temperature at about 40°–50° C. by cooling. After the main exothermic reaction is completed, the mixture is stirred for an additional hour. The deep red solution is then treated with one liter of water acidified with 10% hydrochloric acid. Pale yellow crystals separate which can be recrystallized from water.

TABLE V

DIHYDROXY-BENZIMIDAZOLE DERIVATIVE (IV)

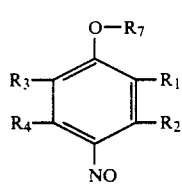

| R = H Example | R' | Melting point or Decomposition point (°C.) |
|---|---|---|
| H-110 | CH₃ | 99 |
| H-111 | C(O)CH₃ | 91 |
| H-112 | C(O)C₆H₅ | 129 |
| H-113 | C(O)NHC₆H₅ | 183 |
| H-114 | CH₂CH₂CN | 172 |

Aromatic nitroso and di-nitroso compounds also are useful in the process of the present invention as chemical agents capable of promoting the formation of filler-elastomer linkages. The aromatic nitroso compounds may be aromatic amines, including polyamines or phenolic compounds.

In one embodiment, the aromatic nitroso compounds may be characterized by the formulae

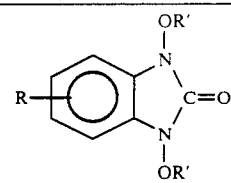

wherein $R_1$, $R_2$, $R_3$ and $R_4$ may be the same or different, and each represents a hydrogen atom, a saturated or unsaturated aliphatic group or an alkoxy, aryl, aralkyl, alkaryl or halogen group which may contain one or more non-carbon atoms, or $R_1$ and $R_2$, or $R_3$ and $R_4$ together may form one or more additional aromatic rings fused to the aromatic ring shown in the formulae; $R_5$ and $R_6$ and $R_7$ may be the same or different, and each represents a hydrogen atom, a saturated or unsaturated aliphatic group, or an aryl, aralkyl or alkaryl group which may contain one or more non-carbon atoms, or $R_5$ and $R_6$ may be NO, or $R_5$ and $R_6$ together with the nitrogen atom to which they are attached may form a heterocyclic ring which may contain one or more heteroatoms. The preferred aromatic nitroso compounds of Formulae VA and VB are those in which the —NR₅R₆ or —OR₇ group is in a position para to the nitroso group.

In one embodiment, the nitroso compounds are derivatives of p-nitrosoaniline having one hydrogen atom and one organic substituent attached to the amino nitrogen atom. Examples of suitable organic substituents are alkyl groups containing from about 1 to about 12 carbon atoms, phenyl groups, and substituted alkyl groups. The nitrosoaniline also may contain nuclear substituents such as, for example, halogen, alkyl or alkoxy groups. Compounds in which the organic substituent is attached to the ring as well as to nitrogen also are useful such as nitrosoquinoline compounds.

These p-nitrosoaniline compounds can be prepared by nitrosation of the corresponding N-substituted anilines in a typical mannner used for the nitrosation of secondary aromatic amines. Reaction of the secondary amine with cold nitrous acid produces an N-nitroso compound which rearranges to a para-nitrosoaniline under the influence of an excess of hydrochloric acid. In some cases, it is more convenient to effect the nitrosation and rearrangement in one step by conducting the reaction in methanol solution in the presence of an excess of hydrogen chloride under anhydrous conditions. This procedure is described by Wyler et al in U.S. Pat. No. 2,046,356.

In addition to the above-described compounds wherein the nitroso group is attached to a carbon atom, aromatic amine compounds also have been described wherein the nitroso group is attached to the amino nitrogen atom. An example of such a compound is N-nitroso-N-methylaniline. In another, embodiment, the nitroso aromatic amines may contain two nitroso groups, one on a carbon atom and the second on an amino nitrogen atom. An example of such compound is N,4-di-nitroso-N-methylaniline.

Additional examples of such nitroso secondary or tertiary amine compounds useful in the process of the present invention are as follows:
3-chloro-N-ethyl p-nitrosoaniline
3-ethoxy N-ethyl p-nitrosoaniline
N-methyl-p-nitrosoaniline
N-ethyl-p-nitrosoaniline
N-butyl-p-nitrosoaniline
N-isopropyl-p-nitrosoaniline
N-sec. butyl-p-nitrosoaniline
N-amyl-p-nitrosoaniline
N-hexyl-p-nitrosoaniline
N-heptyl-p-nitrosoaniline
N-octyl-p-nitrosoaniline
N-decyl-p-nitrosoaniline
N-dodecyl-p-nitrosoaniline
N-cyclohexyl-p-nitrosoaniline
methyl-N-(p-nitrosophenyl)beta-alanine
N-(p-nitrosophenyl)glycine amide
3-(p-nitrosoanilino)propionamide
2-(p-nitrosoanilino)ethanol
p-nitroso-diphenylamine The nitroso aromatic amine compounds also may be N-nitroso, p-nitroso and N,p-dinitroso derivatives of N-alkyl aniline with various additional substituents such as represented by Formula VC

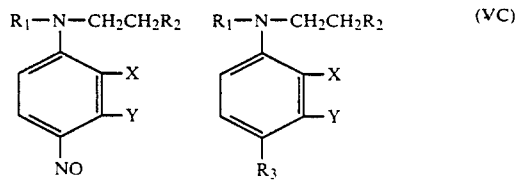

wherein $R_1$ is H or NO; $R_2$ is CN or COOCH₃; $R_3$ is H or NO; X, Y are CH₃ or H; at least one of $R_1$ and $R_3$ being NO.

Specific examples of such nitroso compounds include:
p-nitrosoanilinopropionitrile
methyl ether of p-nitrosoanilinopropionic acid
N,4-dinitrosoanilinopropionitrile The aromatic nitroso compounds useful in this invention also may be diamines such as N-nitroso-N,N'-disubstituted aryleneamines represented by the general formula

wherein R and $R^1$ are the same or different alkyl groups, saturated or unsaturated, or alicyclic groups, and $R^2$ is a nitroso group or hydrogen. Generally R and $R^1$ will contain at least 4 carbon atoms. Typical examples of such arylene diamines include:
N,N'-diethyl-N,N'-dinitroso-p-phenylenediamine
N,N'-dipropyl-N,N'-dinitroso-p-phenylenediamine
N,N'-di-isopropyl-N,N'-dinitroso-p-phenylenediamine
N,N'-diallyl-N,N'-dinitroso-p-phenylenediamine
N,N'-di-2-chloroallyl-N,N'-dinitroso-p-phenylene diamine
N,N'-di-3-chloroallyl-N,N'-dinitroso-p-phenylene diamine
N,N'-di-2,3-di-chloroallyl-N,N'-dinitroso-p-phenylenediamine
N-cyclohexyl-N'-2-chloroallyl-N,N'-dinitroso-p-phenylenediamine
N,N'-dibutyl-N-nitroso-o-phenylenediamine
N,N'-di-isopropyl-N-nitroso-o-phenylenediamine
N,N'-dimethyl-N-nitroso-o-phenylenediamine
N,N'-dicyclohexyl-N,N'-dinitroso-p-phenylenediamine
N,N'-di-isobutyl-N,N'-dinitroso-p-phenylenediamine
N,N'-dihexyl-N,N'-dinitroso-p-phenylenediamine
N,N'-dihexyl-N,N'-dinitroso-p-phenylenediamine
N,N'-dioctyl-N,N'-dinitroso-p-phenylenediamine
N,N'-dioctenyl-N,N'-dinitroso-p-phenylenediamine
N,N'-diheptyl-N,N'-dinitroso-p-phenylenediamine
N,N'-diheptenyl-N,N'-dinitroso-p-phenylenediamine
N,N'-dinonyl-N,N'-dinitroso-p-phenylenediamine
N,N'-dinonenyl-N,N'-dinitroso-p-phenylenediamine
N,N'-didecyl-N,N'-dinitroso-p-phenylenediamine
N,N'-didecenyl-N,N'-dinitroso-p-phenylenediamine
N,N'-diundecyl-N,N'-dinitroso-p-phenylenediamine
N,N'-diundecenyl-N,N'-dinitroso-p-phenylenediamine
N,N'-didodecyl-N,N'-dinitroso-p-phenylenediamine
N,N'-didodecenyl-N,N'-dinitroso-p-phenylenediamine
N,N'-dibutyl-N,N'-dinitroso-p-phenylenediamine
N,N'-di-sec-butyl-N,N'-dinitroso-p-phenylenediamine
N-sec-butyl-N'-isopropyl-N,N'-dinitroso-p-phenylenediamine
N-sec-butyl-N'-cyclohexyl-N,N'-dinitroso-p-phenylenediamine N,N'-dicyclo-hexyl-N-nitroso-p-phenylenediamine The nitroso aromatic amines also may be quinoline compounds generally represented by the formula

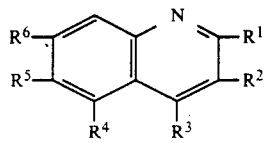

wherein $R^1$, $R^2$, $R^3$, $R^4$, $R^5$ and $R^6$ are the same or different substituents which may be a hydrogen atom, an alkyl group, an aralkyl group, a cycloalkyl group, an aminoalkyl group, or a hydroxyl group.

Specific examples of such nitroso quinoline compounds are:
5-nitroso-8-hydroxyquinoline
5-nitroso-7-dibutylaminomethylene-8-hydroxyquinoline
5-nitroso-7-morpholinomethylene-8-hydroxyquinoline
7-nitroso-8-hydroxy-5-methylquinoline
5-nitroso-8-hydroxy-6-methylquinoline
8-nitroso-5-hydroxy-6-methylquinoline
5-nitroso-8-hydroxy-7-methylquinoline
5-nitroso-6-hydroxyquinoline
5-nitroso-2,8-dihydroxyquinoline
8-nitroso-5-hydroxy-6-hexylquinoline
5-nitroso-7-(2-hydroxy-3,5-dimethylbenzyl)-8-hydroxyquinoline
5-nitroso-7-(7-methylene-8-hydroxyquinolyl)-8-hydroxyquinoline
5-nitroso-7-(dibutylaminomethylene)-8-hydroxyquinoline
5-nitroso-7-(4-morpholylmethylene)-8-hydroxyquinoline
6-nitroso-5-hydroxy-8-methylquinoline As noted above, nitroso compounds also may be nitroso phenols (VB) and nitroso naphthols. Specific examples include:
4-nitrosophenol
2-methyl-4-nitrosophenol
3-methyl-4-nitrosophenol
6-nitrosothymol
4-nitrosophenyl ethyl ether
2,6-dimethyl-4-nitrosophenol
2,6-diethyl-4-nitrosophenol
2,6-di-isopropyl-4-nitrosophenol
2,6-di-t-butyl-4-nitrosophenol
3-methyl-4-nitrosophenol
3,5-dimethyl-4-nitrosophenol The first and second mixtures described above can be prepared by conventional techniques using various types of mills, blenders and mixers known in the art. Generally, mixing of components is accomplished in an internal mixer such as a Brabender or small size Banbury mixer, and because of the shear forces involved, the formulation process generally is exothermic and high temperatures are normal. In one embodiment, the elastomer is added to the mixer with mixing, and the reinforcing filler and/or chemical agent are added while mixing is continued. In one preferred embodiment when carbon black is the reinforcing filler and the chemical agent is an aromatic furazan oxide, the carbon black is combined with the aromatic furazan oxide and heated to form a product such as described in U.S. Pat. No. 4,577,306, and this carbon black/furazan oxide product then is blended into the elastomer to form a mixture or the product is considered a second mixture which is added to a first mixture.

The amount of carbon black included in each of the first and second mixtures may be varied depending upon the total amount of carbon black desired in the final composition. Generally, the relative amount of carbon black included in the first and second mixtures, based on the weight of the elastomer, is about 1:1, but the weight ratio may be varied at about 1.5:0.5 to about 0.5:1.5. The total amount of carbon black included in the compositions of the present invention may be varied over a wide range and the amount can be readily determined by one skilled in the art depending upon the elastomers and the desired properties. The amount of carbon black in the uncured compositions of the present invention may range from about 30 to about 150 parts per 100 parts of elastomer.

The amount of chemical agent or hysteresis improver included in the uncured rubber compositions prepared in accordance with the process of the present invention is a minor property-improving amount. That is, the amount of the chemical agent or hysteresis improver incorporated into the unvulcanized rubber composition generally will be an amount which is sufficient to provide desirable properties to the rubber composition in its uncured, as well as cured form. The amount of chemical agent will be an amount which will improve the processability of the composition, and in certain instances, its green strength and/or viscosity properties. Processability properties are those related to the ease and efficiency of mixing, mastication and handling of a rubber composition in its unvulcanized, that is, uncured state. Similar amounts are used in the cured compositions to improve such vulcanizate properties as filler interaction, modulus, resiliency, hysteresis, rolling loss, running temperature and the like. Typically, this property-improving amount of chemical agent will range from about 0.1 to about 10 parts per 100 parts by weight of elastomer (phr). More often, the total amount of chemical agent present in the third mixture will range from about 0.5 to about 3 phr.

The amount of the chemical agent or chemical agents included in the first mixture and optionally the second mixture is not critical, except in one embodiment, the relative amounts in the two mixtures is generally based on the amounts of filler in each mixture. That is, if mixture (A) contains more filler than mixture (B), then mixture (A) will contain more chemical agent than mixture (B) to insure that the desired filler-elastomer linkages are formed. In general, the ratio of filler (carbon black) to chemical agent (when present) in each of the mixtures may range from about 100:1 to about 25:1. The amount of chemical agent to be included in each mixture can be readily determined by one skilled in the art with a minimum of experimentation.

When the first and second mixtures have been prepared as described above, the uncured compositions of the present invention are, prepared by blending the two mixtures by conventional techniques using various types of mills, blenders and mixers as described above. Internal mixers generally are utilized, and because of the shear forces involved in the blending operation, the formulation process is exothermic and high temperatures are normal. When the blending operation is completed, the mixture is dropped from the mixer yielding the desired uncured modified rubber compositions.

The filled vulcanizates of the present invention are prepared by vulcanizing the above-described uncured modified rubber compositions which may contain up to about 10% by weight of the chemical agent based on the total weight of the elastomer. The uncured compositions of the present invention are vulcanized by adding to the uncured compositions, conventional sulfur- or peroxide-based curing systems. They are used in conventional amounts and incorporated into the uncured compositions of the invention by known techniques and procedures. Fillers (in addition to the above reinforcing fillers) also may be included. Other materials normally included in the rubber formulations include antioxidants, accelerators, retarders, coupling agents, promoters, etc.

The vulcanizates of the present invention are prepared by curing these compositions containing the uncured modified rubber compositions and other additives under conditions of temperature and time customarily used in the art. Typically, the curing system will be a sulfur-curing system comprising from about 0.5 to about 7 phr sulfur, and from about 0.5 to about 2.5 phr accelerator. The curing system also may include promoters such as zinc stearate to reduce the time of curing. The zinc stearate may be formed in situ by incorporating zinc oxide and stearic acid into the formulation.

The following examples illustrate the preparation of the above-described first and second mixtures as well as the uncured and cured rubber compositions of the present invention. Unless otherwise indicated in the examples or elsewhere in the application and claims, all parts and percentages are by weight, and temperatures are in degrees centigrade.

EXAMPLES 1 to 6 AND C-1 to C-6

First and Second Mixtures

In this series of examples, Examples 1 to 6 contain an aromatic furazan oxide, namely, benzofurazan oxide (BFO). Examples C-1 to C-6 are control samples corresponding to Examples 1 to 6 respectively but containing no benzofurazan oxide. The mixtures of the various examples were prepared in a Banbury mixer, and the elastomer is first introduced to the Banbury followed by a mixture of carbon black and benzofurazan oxide as indicated in the following table. The mixing reaction is exothermic, and at the end of the mixing cycle (generally about 6 minutes), the composition is dropped from the mixer and cooled.

The elastomer utilized in Examples 1, 2, 3, C-1, C-2 and C-3 is 100% natural rubber (heveci) and the elastomer in Examples 4, 5, 6, C-4, C-5 and C-6 is an SBR rubber containing 86% solids (tradename Duradene), available from Firestone Tire and Rubber Company, Akron, Ohio, U.S.A. The carbon black utilized in all of the examples is N-351 black.

TABLE VI

| | First and Second Mixtures | | | | |
|---|---|---|---|---|---|
| Example | NR | SBR | N351 Black | BFO | Total Parts |
| 1 | 35 | — | 22.05 | 0.35 | 57.4 |
| C-1 | 35 | — | 22.05 | — | 57.05 |
| 2 | 35 | — | 30.24 | 0.35 | 65.59 |
| C-2 | 35 | — | 30.24 | — | 65.24 |
| 3 | 35 | — | 17.64 | 0.35 | 52.99 |
| C-3 | 35 | — | 17.64 | — | 52.64 |
| 4 | — | 75.4 | 40.95 | 0.65 | 117.0 |
| C-4 | — | 75.4 | 40.95 | — | 116.35 |
| 5 | — | 75.4 | 32.76 | 0.65 | 108.81 |
| C-5 | — | 75.4 | 32.76 | — | 108.16 |

TABLE VI-continued

| | First and Second Mixtures | | | | |
|---|---|---|---|---|---|
| Example | NR | SBR | N351 Black | BFO | Total Parts |
| 6 | — | 75.4 | 45.36 | 0.65 | 121.41 |
| C-6 | — | 75.4 | 45.36 | — | 120.76 |

EXAMPLES 7 to 9 AND C-7 to C-10

Mixed Composition

Examples 7 to 9 illustrate the compositions of the invention including conventional curing systems whereas examples C-7 to C-10 are control examples for comparison purposes. The components included in compositions of these examples are summarized in Table VII.

The uncured masterbatches are prepared in an internal mixer such as a Brabender or small size Banbury mixer. The usual technique is to add the various components to the preheated cavity of the mixer, continuing the mixing for the indicated period of time, then making further additions with mixing, etc. A typical technique is according to the following schedule.

| Time (Min.) | Add to Mixer |
|---|---|
| 0 | First elastomer mixture (or second) |
| 0.5 | Second elastomer mixture (or first) |
| 1.5 | Zinc oxide, stearic acid, curing agents, etc. |
| 3.0 | Processing oil |
| 6.0 | Drop mixed composition at about 170–190° C. (340–380° F.) |

TABLE VII

| | Mixed Elastomer Compositions | | | | | |
|---|---|---|---|---|---|---|
| Component/ Example | 7 | C-7 | 8 | C-8 | 9 | C-9 |
| 1 | 57.4 | — | — | — | — | — |
| 4 | 117.0 | — | — | — | — | — |
| C-1 | — | 57.05 | — | — | — | — |
| C-4 | — | 116.35 | — | — | — | — |
| 2 | — | — | 65.59 | — | — | — |
| 5 | — | — | 108.81 | — | — | — |
| C-2 | — | — | — | 65.24 | — | — |
| C-5 | — | — | — | 108.16 | — | — |
| 3 | — | — | — | — | 52.99 | — |
| 6 | — | — | — | — | 121.41 | — |
| C-3 | — | — | — | — | — | 52.64 |
| C-6 | — | — | — | — | — | 120.76 |
| ZnO | 3 | → | → | → | → | → |
| Stearic Acid | 2 | → | → | → | → | → |
| Oil | 20 | → | → | → | → | → |
| Santoflex-13 | 1 | → | → | → | → | → |
| Wax | 2 | → | → | → | → | → |
| Sulfur | 1.4 | → | → | → | → | → |
| Santocure-NS | 1.0 | → | → | → | → | → |
| Sulfasan R | 2.0 | → | → | → | → | → |
| Carbon black distribution ratio First: Second Mixtures | 1:1 | 1:1 | 1.2:0.8 | 1.2:0.8 | 0.8:1.2 | 0.8:1.2 |

The above mixed elastomer masterbatches are banded and sheeted on a small twin roll mill set at 60 gauge. They are then cured in the normal manner at a temperature of about 150° C. over a period of about __ minutes. Some of the properties of the compositions of the invention and the control samples are summarized in Table VIII.

TABLE VIII

| | Properties of Vulcanizates | | | | | | |
|---|---|---|---|---|---|---|---|
| | Product of Example | | | | | | |
| | 7 | C-7 | 8 | C-8 | 9 | C-9 | C-10[b] |
| Shore A Hardness | | | | | | | |
| at 73° F.[a] | 60 | 64 | 59 | 63 | 60 | 63 | 68 |
| % Rebound | | | | | | | |
| at 73° F. | 57.5 | 54 | 58 | 55 | 57 | 54 | 47 |
| at 212° F. | 79.5 | 78 | 80 | 77 | 82 | 77 | 73 |
| MTS Tan Delta | | | | | | | |
| at 73° F. | −46 | −28 | −49 | −32 | −45 | −25 | Par |
| at 212° F. | −35 | −14 | −41 | −22 | −39 | −10 | Par |
| Monsanto Rheometer (300° F.) | | | | | | | |
| TS (2) | 15.4 | 16.0 | 16.0 | 15.1 | 15.6 | 15.7 | 14.6 |
| TS (90) | 22.6 | 26.9 | 22.9 | 24.7 | 22.5 | 25.8 | 27.6 |

[a]Cured at 300° F., 40 minutes.
[b]Vulcanizate prepared by blending 75.4 parts SBR with 35 parts natural rubber followed by 63 parts N-351 Black and then effecting vulcanization with curing components listed in Table III in amounts used for other examples.

Among desirable and beneficial properties which are obtained through the use of the process of the present invention which involve the specified sequential mixing of components are the improved properties observed in the vulcanized compositions prepared from the uncured rubber compositions of the invention. In particular, vulcanized compositions prepared in accordance with the process of the invention exhibit an increase in rebound and reduced low strain hysteresis. When utilized in the treads of tires, the vulcanized compositions prepared in accordance with the method of the present invention exhibit a decrease in the rolling loss and/or running temperatures.

As can be seen from Table VIII, the vulcanized stocks prepared in accordance with the process of the invention exhibit a reduced MTS Tan Delta when compared to similar products of similar formulations prepared without BFO or prepared by pre-blending the two elastomers.

EXAMPLES 10–11

Following the above procedures, first and second mixtures of elastomers, carbon black and chemical agent are prepared as shown in Table IX, and combined in the volume ratios indicated to form uncured elastomer compositions of the present invention. The amounts of the components are shown as phr.

TABLE IX

| | Examples 10-11 | | | |
|---|---|---|---|---|
| | Example 10 | | Example 11 | |
| | Mix. 1 | Mix. 2 | Mix. 1 | Mix. 2 |
| Polybutadiene | 100 | — | 100 | 100 |
| Natural Rubber | — | 100 | — | — |
| N220 Carbon Black | — | 70 | 60 | — |
| N339 Carbon Black | 30 | — | — | 80 |
| Benzophenazine di-N-oxide | — | 1.0 | 0.6 | 0.8 |
| Methyl, isopropyl Quinoxaline di-N-oxide | 0.8 | — | — | — |
| Volume ratio in product | 0.4v | 0.6v | 0.8v | 0.2v |

EXAMPLES 12–17

The following Examples 12–17 illustrate uncured compositions of the present invention obtained utilizing second mixtures containing only two of the three components. In all of the examples, the first mixture comprises 100 parts of polybutadiene, 30 parts of N339 carbon black and 1.0 part of benzophenazine di-N-oxide. The first and second mixtures are combined in a volume ratio of 0.4/0.6. The compositions of the second mixtures are shown in Table X, and the amounts of the components shown in phr.

TABLE X

| | SECOND MIXTURES | | | | | |
|---|---|---|---|---|---|---|
| | Example | | | | | |
| Components | 12 | 13 | 14 | 15 | 16 | 17 |
| Polybutadiene | 100 | — | — | — | — | 100 |
| Natural Rubber | — | 100 | 100 | — | 100 | — |
| N220 Carbon Black | 30 | 30 | — | 30 | — | — |
| N339 Carbon Black | — | — | 30 | — | — | 30 |
| BFO | — | — | — | 1.0 | — | — |
| Benzophenazine di-N-oxide | — | — | — | — | 1.0 | 1.0 |

The vulcanizable rubber compositions of this invention can be molded or shaped into the desired shapes by known techniques, and they can be used for many purposes for which similar compositions are used. For example, shoe soles and heels, raincoats, table covers, hose for transmission of fluids, belts, printer rolls, printer's blankets, engraving plates, battery cases, etc. The use in tire stock is particularly preferred.

While the invention has been described and exemplified herein by reference to specific materials, machinery, techniques, procedures and examples, it is understood that it is not restricted to any of these numerous variations, combinations, and permutations can be made within the scope of the invention as is clear to those skilled in the art.

We claim:

1. A process of preparing chemically modified uncured rubber compositions comprising mixtures of at least one elastomer and at least one reinforcing filler which comprises the steps of
   (A) preparing a first mixture comprising an elastomer, at least one reinforcing filler and at least one chemical agent capable of promoting the formation of filler-elastomer linkages;
   (B) preparing a second mixture comprising
      i an elastomer and at least one reinforcing filler; or
      ii at least one reinforcing filler and at least one chemical agent capable of promoting the formation of filler-elastomer linkages; or
      iii an elastomer and at least one chemical agent capable of promoting the formation of filler-elastomer linkages; and (C) blending the first and second mixtures to form a third mixture wherein the chemical agents in the mixtures of (A) and (B) are selected the group consisting of (a) aromatic furazan oxides of the partial formula

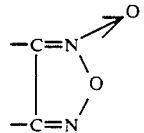

(I)

wherein the depicted carbon atoms are a part of a single fused aromatic ring, (b) aromatic heterocyclic di-N-oxides of the formula

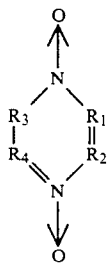

(II)

wherein $R_1$, $R_2$, $R_3$ and $R_4$ may be hydrogen, hydrocarbyl, hydrocarbyloxy, halogen, halohydrocarbyl, hydrocarbyl sulfonyl, hydrocarbyl thio, hydrocarbyl sulfoxide, amino, cyano,

—OH

—CHO

—CH(O hydrocarbyl)$_2$

—C(O)R$^5$

—C(O)OR$^5$

—C(N—OH)R$^5$

—C(O)NR$^5$R$^8$

—CH=N—NH—C(O)OR$^5$

—CH$_2$OC(O)CH$_3$

—R$^6$YR$^5$

—C(O)NHR$^6$OH

—C(NH)NR$^9$R$^{10}$, or

—C(O)NHN(R$^5$)$_2$ wherein each $R^5$ is independently hydrogen or a hydrocarbyl group, $R^6$ is a divalent hydrocarbyl group, $R^8$ is hydrogen, hydrocarbyl, —R$^{60}$R$^5$, or —R$^6$COOR$^5$; $R^9$ is hydrogen or a hydrocarbyl group; $R^{10}$ is hydrogen or a hydrocarbyl, an amino, or a hydroxyl group; $R^9$ and $R^{10}$ may be hydrocarbyl groups joined together to from a ring including the nitrogen atom, and Y is O, divalent S, —NH—, —SO)— or —S(O)$_2$, or $R^5$ and $R^6$ may be joined together to form a ring including the nitrogen atom, and Y is O or divalent S, or $R^1$ and $R^2$ and/or $R^3$ and $R^4$ may be joined together to form further ring systems which may be saturated or unsaturated, and further substituted or unsubstituted, (c) 1-hydroxy-benzimidazole 3-oxide compounds of the formula

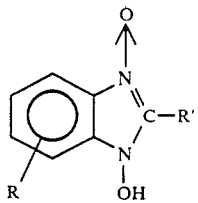

(III)

wherein R is hydrogen, or a halogen, hydroxyl, lower acyl, lower hydrocarbyl, lower hydrocarbyloxy, lower hydrocarbylthio, carboxyl, cyano, amino, amide or —C(O)— lower hydrocarbyl group, and R' is hydrogen, or a lower hydrocarbyl, lower hydrocarbyl amide, carboxyamide carboxy acid, carboxy ester, or aryl group, (d) 1,3-dihydroxy-benzimidazolinone compounds of the formula

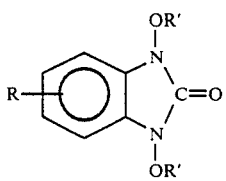

(IV)

wherein R is hydrogen, or a halogen, hydroxyl, lower hydrocarbyl, lower hydrocarbyloxy, lower hydrocarbylthio, lower hydrocarbyl nitrile, carboxyl, cyano, nitro, amino, amide or —C(O)—R''' where R''' is an aryl or lower hydrocarbyl group; each R' independently is H, lower alkyl, acyl, CONR'$_2$ or CONHR'' where R'' is alkyl or aryl, or (e) aromatic nitroso compounds selected from the group consisting of nitroso-substituted aromatic amines and phenols.

2. The process of claim 1 wherein the second mixture comprises (i) an elastomer which is different from the elastomer in the first mixture and at least one reinforcing filler.

3. The process of claim 1 wherein the second mixture comprises (ii) at least one reinforcing filler and at least one chemical agent capable of promoting the formation of filler-elastomer linkages.

4. The process of claim 1 wherein the elastomers in the first and second mixtures are characterized as having different affinities for at least one of the reinforcing fillers.

5. The process of claim 1 wherein the chemical agents in the first and second mixtures are hysteresis improvers.

6. The process of claim 1 wherein the elastomers in the first and second mixtures are NR, IR, BR, SBR, CR, CIIR, NIR or mixtures of two of more of said elastomers.

7. The process of claim 1 wherein the elastomer in one mixture is natural rubber and the elastomer in the other mixture is a synthetic elastomer.

8. The process of claim 1 wherein the reinforcing filler in the first and second mixtures is carbon black.

9. The process of claim 1 wherein the third mixture obtained in step (C) contains up to about 10% by weight of the chemical agent based on the total weight of the elastomers.

10. An uncured modified rubber composition prepared in accordance with the method of claim 1.

11. The process of claim 1 wherein at least one of the chemical agents an aromatic furazan oxide of the formula

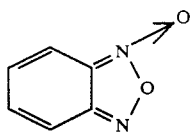 (IA)

wherein none, one or any two of the ring positions can be substituted with lower hydrocarbyl, halogen, hydroxyl, lower hydrocarbyl oxy, lower hydrocarbyl thio, lower hydrocarbyl carbonyl, carbonyl lower hydrocarbyl oxy, nitro, amine or amino groups.

12. The process of claim 11 wherein the furazan oxide is a benzofurazan oxide or a methyl or methoxy analog thereof.

13. The process of claim 1 wherein at least one of the chemical agents is an aromatic heterocyclic di-N-oxide of the partial formula

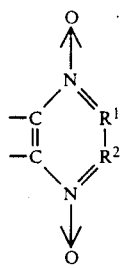 (IIA)

wherein the depicted carbon atoms are part of an optionally substituted aromatic ring, and $R^1$ and $R^2$ are each independently hydrogen, hydrocarbyl, halohydrocarbyl, hydrocarbyloxy, hydrocarbyl sulfonyl, hydrocarbyl thio, hydrocarbylsulfoxidyl, halogen, amino,

—OH

—CHO

—CH(O hydrocarbyl)$_2$

—C(O)R$^5$

—C(O)OR$^5$

—C(N—OH)R$^5$

—C(O)NR$^5$R$^8$

—CH=N—NH—C(O)OR$^5$

—CH$_2$OC(O)CH$_3$

—R$^6$YR$^5$

—C(O)NHR$^6$OH

—C(NH)NR$^9$R$^{10}$, or

—C(O)NHN(R$^5$)$_2$ wherein each $R^5$ is independently hydrogen or a hydrocarbyl group, $R^6$ is divalent hydrocarbyl group, $R^8$ is hydrogen, hydrocarbyl, —R$^6$OR$^5$, or —R$^6$COOR$^5$; $R^9$ is hydrogen or a hydrocarbyl group; $R^{10}$ is hydrogen or a hydrocarbyl, an amino, or a hydroxyl group; $R^9$ and $R^{10}$ may be hydrocarbyl groups joined together to form a ring including the nitrogen atom, and Y is O, divalent S, —NH—, —S(O)— or —S(O)$_2$, or $R^5$ and $R^6$ may be joined together to form a ring including the nitrogen atom, and Y is O or divalent S, or $R^1$ and $R^2$ and/or $R^3$ and $R^4$ may be joined together to form further ring systems which may be saturated or unsaturated, and further substituted or unsubstituted.

14. The process of claim 13 wherein $R^1$ is an OH, a CN or a hydrocarbyl group, and $R^2$ is hydrogen, a lower hydrocarbyl, lower hydrocarbyloxy or lower hydrocarbylthio group.

15. The process of claim 13 wherein the heterocyclic N-oxide is further characterized by the formula

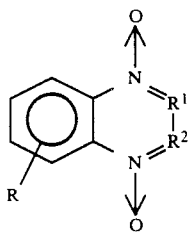 (IIH)

wherein $R^1$ and $R^2$ are as defined in claim 14 and R is hydrogen, or a hydrocarbyl, hydrocarbyloxy, hydrocarbylthio, hydroxyl, halogen, cyano, amino; —C(O)-hydrocarbyl, amide, or ester group.

16. The process of claim 14 wherein R is hydrogen and $R^1$ and $R^2$ are hydrocarbyl groups.

17. The process of claim 13 wherein the di-N-oxide is further characterized by the formula

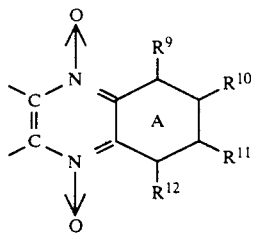 (IIG)

wherein the depicted carbon atoms are part of an aromatic ring which may be substituted, ring A is aromatic or non-aromatic, $R^9$, $R^{10}$, $R^{11}$ and $R^{12}$ are each independently hydrogen or a hydrocarbyl, hydrocarbyl, hydrocarbylthio, hydroxyl, amino, nitro carboxylic, carboxylic ester, amide, or cyano group, and when ring A is an aromatic ring, any two or more adjacent groups may be joined together to form additional aromatic rings.

18. The process of claim 17 wherein ring A is aromatic and at least one of the R groups is a hydroxyl or cyano group.

19. The process of claim 1 wherein at least one of the chemical agents a 1-hydroxy-benzylimidazol-3-oxide compound of the formula

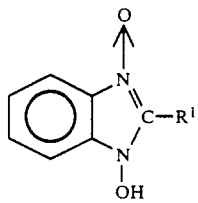

(IIIA)

wherein R¹ is hydrogen or a lower alkyl group or a phenyl group.

20. The process of claim 1 wherein at least one of the chemical agents a 1,3-dihydroxybenzimidazolinone compound of the formula

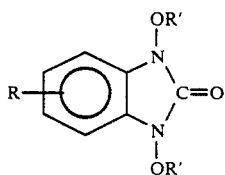

(IV)

wherein R is hydrogen, or a halogen, hydroxyl, lower hydrocarbyl, lower hydrocarbyloxy, lower hydrocarbylthio, lower hydrocarbyl nitrile, carboxyl, cyano, nitro, amino, amide or —C(O)—R''' where R''' is an aryl or a lower hydrocarbyl group; each R' independently is H, lower alkyl, acyl, CONR'₂ or CONHR'' where R'' is alkyl or aryl.

21. The process of claim 20 wherein R is in the five-position and R is hydrogen, methyl or methoxy.

22. The process of claim 1 wherein at least one of the chemical agents a nitrosoaniline.

23. The process of claim 22 wherein the nitrosoaniline is a C-nitroso, N-nitroso, or a C,N-di-nitrosoaniline.

24. A process of preparing uncured furazan oxide-modified rubber compositions comprising mixtures of two or more elastomers having different affinities to a reinforcing filler which comprises the steps of
   (A) preparing a first mixture comprising a first elastomer, at least one reinforcing filler, and at least one aromatic furazan oxide,
   (B) preparing a second mixture comprising (i) a second elastomer and at least one reinforcing filler; or
(ii) at least one reinforcing filler and at least one aromatic furazan oxide; or
(iii) a second elastomer and at least one aromatic furazan oxide wherein the aromatic furazan oxide in the first and second mixtures is of the formula

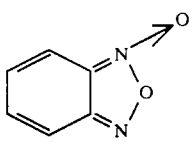

(IA)

wherein none, one or any two of the ring positions can substituted with lower hydrocarbyl, halogen, hydroxy, lower hydrocarbyl oxy, lower hydrocarbyl thio, lower hydrocarbyl carbonyl, carbonyl lower hydrocarbyl oxy, nitro, amine or amino groups, and (C) blending the first and second mixtures to form a third mixture.

25. The process of claim 24 wherein the first elastomer is natural rubber and the second elastomer is a synthetic elastomer.

26. The process of claim 25 wherein the synthetic elastomer is IR, BR, SBR, CR, CIIR, NIR, or a mixture of two or more of said synthetic elastomers.

27. The process of claim 24 wherein the furazan oxide is a benzofurazan oxide or a methyl or methoxy analog thereof.

28. The process of claim 24 wherein the reinforcing filler in the first and second mixture is carbon black.

29. The process of claim 28 wherein the carbon black has a surface area of at least about 20 m²/g.

30. The process of claim 25 wherein the third mixture obtained in (C) contains from about 6 to about 30 parts by weight of natural rubber, and from about 40 to about 70 parts by weight of the synthetic elastomer.

31. The process of claim 25 wherein the third mixture obtained in (C) contains from about 0.001 to about 0.5 mole of the aromatic furazan oxide per mole of natural rubber and synthetic elastomer in the mixture.

* * * * *

UNITED STATES PATENT AND TRADEMARK OFFICE
CERTIFICATE OF CORRECTION

PATENT NO. : 5,001,171
DATED : March 19, 1991
INVENTOR(S) : Georg G. A. Bohm, et. al.

It is certified that error appears in the above-indentified patent and that said Letters Patent is hereby corrected as shown below:

Column 31, line 60, "$-R^{60}R^5$" should read ---$R^6OR^5$---;

Column 31, line 66, "-SO)-" should read ---S(O)---;

Column 32, line 40, "$CONR'_2$" should read --$CONR''_2$--;

Column 34, line 57, "hydrocarbyl, hydrocarbyl," should read --hydrocarbyl, hydrocarbyloxy,--;

Column 35, line 30 "$CONR'_2$" should read --$CONR''_2$--.

Signed and Sealed this

Ninth Day of November, 1993

Attest:

BRUCE LEHMAN

Attesting Officer

Commissioner of Patents and Trademarks